(12) United States Patent
Sengodan et al.

(10) Patent No.: US 7,684,798 B2
(45) Date of Patent: Mar. 23, 2010

(54) METHOD OF PRE-AUTHORIZING HANDOVERS AMONG ACCESS ROUTERS IN COMMUNICATION NETWORKS

(75) Inventors: Senthil Sengodan, Woburn, MA (US); Govind Krishnamurthi, Arlington, MA (US); Ram Gopal, Woburn, MA (US)

(73) Assignee: Nokia Corporation, Espoo (FI)

( * ) Notice: Subject to any disclaimer, the term of this patent is extended or adjusted under 35 U.S.C. 154(b) by 1355 days.

(21) Appl. No.: 09/986,778

(22) Filed: Nov. 9, 2001

(65) Prior Publication Data

US 2003/0092444 A1 May 15, 2003

(51) Int. Cl.
*H04Q 7/20* (2006.01)
(52) U.S. Cl. ................. 455/436; 455/437; 455/438; 455/439; 455/442; 370/338; 370/392; 370/401; 370/328; 370/402
(58) Field of Classification Search ............ 455/456.2, 455/67.11, 67.14, 423–425, 453, 442, 436, 455/435.1, 422.1, 428, 439, 552.1, 555, 554.1, 455/462, 438
See application file for complete search history.

(56) References Cited

U.S. PATENT DOCUMENTS

| | | | | |
|---|---|---|---|---|
| 5,499,387 | A * | 3/1996 | Chambert | 455/436 |
| 5,966,658 | A * | 10/1999 | Kennedy et al. | 455/426.1 |
| 6,088,368 | A | 7/2000 | Rubinstain et al. | |
| 6,104,700 | A | 8/2000 | Haddock et al. | |
| 6,988,146 | B1 * | 1/2006 | Magret et al. | 709/238 |
| 2001/0053694 | A1 * | 12/2001 | Igarashi et al. | 455/433 |
| 2002/0068570 | A1 * | 6/2002 | Abrol et al. | 455/438 |
| 2003/0013443 | A1 * | 1/2003 | Willars et al. | 455/432 |
| 2003/0036392 | A1 * | 2/2003 | Yukie | 455/461 |
| 2003/0087646 | A1 * | 5/2003 | Funato et al. | 455/456 |

FOREIGN PATENT DOCUMENTS

| | | |
|---|---|---|
| WO | 0044148 A1 | 7/2000 |
| WO | WO0078081 | 12/2000 |

OTHER PUBLICATIONS

European Search Report (02785780.4 dated Mar. 23, 2006).
Valko, A. et al. "Cellular IP," Nov. 18, 1998, pp. 1-19, Online: http://comet.ctr.columbia.edu/cellularip/pub/draft-valko-cellularip-00.t, (abstract, p. 3, line 1-p. 10, line 41).
TS 123 140 V4.3.0: "Digital cellular telecommunications system (Phase 2+) (GSM); Universal Mobile Telecommunications System (UMTS); Multimedia Messaging Service (MMS); Functional description; Stage 2" ETSI Standards, European Telecommunications Standards Institute, Jun. 2001.
TS 123 140 V4.5.0: "Digital cellular telecommunications system (Phase 2+) (GSM) Universal Mobile Telecommunications System (UMTS); Multimedia Messaging Service (MMS); Functional description; Stage 2" ETSI Standards, European Telecommunications Standards Institute, Dec. 2001.

* cited by examiner

*Primary Examiner*—Charles N Appiah
*Assistant Examiner*—Randy Peaches
(74) *Attorney, Agent, or Firm*—Banner & Witcoff Ltd.

(57) ABSTRACT

An apparatus and method is provided for facilitating the handoff of a mobile terminal from a first access device in a first network to a second access device in a second network. Prior to performing a handoff operation, the first access device inquires as to whether the mobile terminal is authorized to be handed off to the second access device and, in response thereto, completes the handoff. If the mobile terminal is not authorized to be handed off to the second access device, the handoff operation is inhibited, preferably without using any radio frequency resources of the second access device.

36 Claims, 6 Drawing Sheets

METHOD OF PRE-AUTHORIZING HANDOVERS AMONG ACCESS ROUTERS IN COMMUNICATION NETWORKS

FIELD OF THE INVENTION

The invention relates generally to telecommunications networks. More particularly, the invention provides a method and apparatus for pre-authorizing handovers of mobile terminals among access routers in communication networks, such as wireless networks.

BACKGROUND OF THE INVENTION

Mobile devices can provide both voice-based connections and packet-based data connections using different base stations and infrastructures. For example, a Web-enabled cell phone might maintain a voice connection using a first transmission channel and maintain a mobile IP connection using a second (and independent) transmission channel, such that handoffs occur independently for the two channels. Alternatively, voice services can be combined with packet services, such that a single connection is maintained for both services. Voice connections can also be provided over IP in a combined service.

FIG. 1 shows a network with mobility features that covers three service areas SA1, SA2, and SA3. As shown in FIG. 1, a mobile terminal MT is within service area SA1 served by base station BS1 (also called an access point or AP). A service area generally refers to the radio coverage associated with a radio tower/base station.

Base station BS1 is connected to an access router AR1, which provides access to the Internet. Other base stations such as BS3 may also be connected to access router AR1, such that a common IP address is used for mobile terminals even though the terminals may pass through different service areas. In other words, although there may be a hand off of radio frequency channels when the mobile terminal moves between service area SA1 and service area SA3, it may not be necessary to change the IP address used to communicate with the mobile terminal because the Internet connection is still served by the same access router AR1.

A second service area SA2 is served by a separate base station BS2, which is in turn connected to a different access router AR2. Due to the network topology, access routers AR1 and AR2 use different blocks of IP addresses for communicating with mobile terminals roaming within their associated service areas. If mobile terminal MT moves from service area SA1 to service area SA2, some mechanism is needed to hand off the Internet connection from access router AR1 to access router AR2. Similarly, if service areas SA1 and SA2 are separated by a large logical distance (e.g., AR1 and AR2 are connected to different ISPs), some coordination mechanism is needed to permit data transmitted to a terminal previously operating in service area SA1 to be forwarded to service area SA2 if that terminal moves into area SA2.

One conventional scheme for handing off IP connections is depicted in FIG. 2. Service area SA1 is served by access router AR1, which is designated the "home agent" for communicating with a particular mobile terminal MT. While mobile terminal MT moves within service area SA1, correspondence nodes communicate with the mobile terminal using an IP address that is assigned by the access router AR1 to the mobile node. IP packets (e.g., e-mail, Web pages, and the like) are transmitted over the Internet to the home network and are forwarded to the mobile terminal through the home agent.

If the mobile terminal MT moves to a different service area SA2, served by a different access router AR2, packets that were previously transmitted to AR1 will no longer reach the mobile terminal.

One conventional approach for handing off mobile nodes is to advertise (e.g., broadcast) the existence of access router AR2 in service area SA2, such that when mobile terminal MT moves into service area SA2, it is notified of the existence of access router AR2, and it receives a new IP address for communicating within service area SA2. The mobile terminal MT then sends a binding update to home agent AR1 (e.g., through a land line LL or over the Internet), so that home agent AR1 knows the IP address that will allow packets to reach the mobile terminal in service area SA2. The home agent treats this address as a "care of" address, and all further packets to the mobile terminal's home address are forwarded to the new IP address. In essence, two separate IP addresses are used to communicate with the mobile terminal: a home agent address and a care of address that changes when the MT moves into a new service area.

When a mobile node moves from one access router to another, the packet forwarding path of sessions to and from the mobile node changes. In order to minimize the impact of a change in access routers, relevant context is transferred from the originating access router to the new access router. As described in H. Syed et al., "General Requirements for a Context Transfer Framework," draft Internet Engineering Task Force Seamoby requirements work in progress (May 2001), the context transfer protocol entities may, in the process of establishing and supporting context transfer, acquire information that would be useful to the handover process in determining the new forwarding path; for example, the outcome of an admission control decision at a receiving access router.

A mobile terminal may move into an area that is served by two or more access routers. As with cellular telephone roaming, however, the mobile terminal may not be authorized to be handed off to certain access routers. Conventional handovers of mobile terminals from an originating access router to a target access router occur before determining whether the target access router is in fact authorized to service the mobile terminal. After the target access router accepts a handoff of a mobile terminal, it may perform a check to determine whether the mobile terminal is authorized to be serviced. If it is not, the service connection is dropped.

In other words, the handover decision from one AR to another AR is conventionally handled independently of whether the mobile terminal is authorized to roam into the network of the new AR. Typically, the mobile terminal is handed over to the new AR, then an authorization process ensues to determine whether the mobile terminal is authorized to roam into the new network. However, dropping the service connection with an unauthorized mobile terminal unnecessarily wastes resources, such as maintaining a connection with the mobile terminal for a period of time before the unauthorized service is discovered. It also wastes radio frequency spectrum, since radio resources are allocated to the mobile node prior to authorization. If the mobile node is determined not to be authorized, then radio resources must be revoked upon such determination of lack of authorization.

If there are several candidate access routers to which handover could result, for example those providing different access technologies (e.g., IEEE 802.11 WLANS or Bluetooth), a mobile node may not be authorized to roam into the network of certain service providers. Consequently, the conventional scheme for performing handoffs to access routers wastes resources and can delay handover processing.

What is needed is a system and method for addressing some or all of the aforementioned problems.

SUMMARY OF THE INVENTION

The invention provides a system and method to facilitate handoffs among access routers in networks such as wireless networks. According to one aspect of the invention, an originating access router inquires as to whether a target access router is authorized to accept a handoff of a mobile terminal and, if such authorization exists, initiates the handoff to the target access router. According to another variation of the invention, the target access router queries a home network to determine whether the mobile terminal is authorized to be handed off to the target access router and does not initiate the handoff operation until such authorization has been obtained. Authorization may be provided on the basis of static information, such as administrative approval, or on the basis of dynamic information, such as loading conditions.

In both embodiments, authorization of a mobile node's handover from one access router to another takes place prior to the actual handover. The inventive mechanism also allows for authorization for mobile nodes before a handover takes place even between heterogeneous networks. If there are several candidate access routers to which handover could result, then obtaining authorization information could help in determining the most favorable access router to which the handover should be made. Where more than one service provider permits roaming for a given mobile node, knowledge of relevant authorization information from the different service providers can allow for an optimal handover decision. Radio resources associated with the target access router are not used until a decision to hand over the mobile terminal has been made.

DETAILED DESCRIPTION OF THE INVENTION

Figure 3:
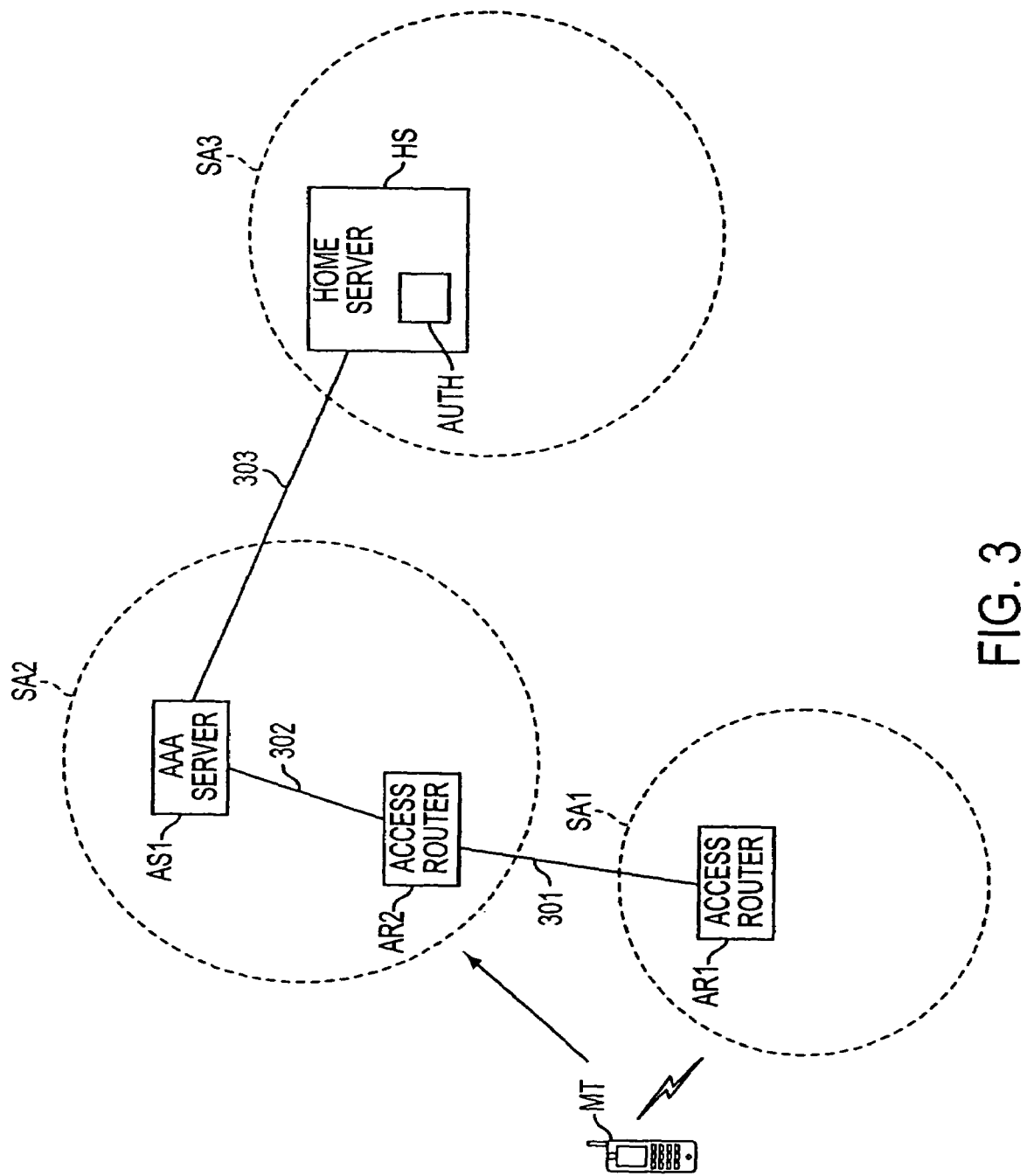
FIG. 3 shows a system according to one aspect of the invention, wherein the handoff of a mobile terminal from an originating access router to a target access router does not occur until after a determination is made as to whether the target access router is authorized to service the mobile terminal.

FIG. 3 shows a system employing various principles of the invention. As shown in FIG. 3, a first access router AR1 serves a first service area SA1 in which a mobile terminal MT may be located. Although not explicitly shown in FIG. 3, it is assumed that each access router transmits and receives data packets through one or more base stations that cover corresponding geographic areas. It is also assumed that each access router provides Internet-compatible services (e.g., IP protocol compatibility) such that data packets received at each router can be forwarded to one or more mobile terminals within the corresponding service area, although the invention is not limited in this respect.

Suppose that mobile terminal MT moves from area SA1, which is served by access router AR1, to area SA2, which is served by access router AR2. It is assumed that access router AR1 and AR2 communicate either directly or indirectly (e.g., through the Internet, land lines, other devices, or wireless means) as depicted by path 301 such that AR1 can effect a handoff of mobile terminal MT to AR2. AR2 further communicates with an AAA server AS1 as depicted by path 302. AAA refers to Authentication, Authorization and Accounting, which generally defines protocols and services relating to accounting and authorization for network services, see, e.g., IETF RFC 2924, September 2000 and "Diameter Mobile Ipv4 Application," Internet Draft, July 2001. Server AS1 communicates with a home server HS located in a home network SA3, as depicted by path 303. Home server HS contains authorization information AUTH as explained in more detail below.

As shown in FIG. 3, communication path 301 between AR1 and AR2 may be implemented using the Session Initiation Protocol (SIP), whereas communication path 302 between AR2 and AS1 may be implemented using an AAA protocol such as DIAMETER. Communication path 303 between AS1 and home server HS may also be implemented according to the DIAMETER protocol. In one variation, AR1 transmits a SIP message with an OPTION method that contains details regarding the mobile terminal and the target access router AR2. This message is then translated into a suitable DIAMETER message for transport over the interfaces where DIAMETER is used. The Session Initiation Protocol (SIP) is described in the Internet Engineering Task Force (IETF) Request for Comment number 2543.

According to one aspect of the invention, prior to performing the handoff of mobile terminal MT from AR1 to AR2, access router AR1 contacts AR2 to inquire about authorization information for mobile terminal MT. AR2 in turn contacts server AS1 for such information, which in turn contacts home server HS via path 303 to determine whether the mobile terminal is authorized to be handed off to access router AR2. If the mobile terminal is authorized, the handoff proceeds; otherwise, the handoff is aborted. Arranging a handoff may include procedures of context transfer (see, e.g., R. Koodli and C. Perkins, "A Context Transfer Framework for Seamless Mobility," Work in Progress, Internet Draft, February 2001), or fast handover (see, e.g., G. Tsirtsis et al., "Fast Handovers for Mobile IPv6," Work in Progress, Internet Draft, April 2001).

According to one aspect of the invention, radio resources are not used during the authorization process in order to determine whether the handoff should proceed. For example, AR2 need not allocate a radio channel to communicate with the mobile terminal until after it has been determined that the mobile terminal is authorized to be handed off to AR2.

The linking of an access router such as AR2 to an AAA server such as AS1 via DIAMETER, and the further linking of an AAA server such as AS1 to a home network server such as HS via the DIAMETER protocol, is conventional and described in the 3$^{rd}$ Generation Partnership Project (3GPP2) specification TS 23.228 version 5.0.0 (April 2001). However, the use of the architecture in the manner described above to perform pre-handover authorization between two access routers serving different networks is not conventional.

Figure 4:
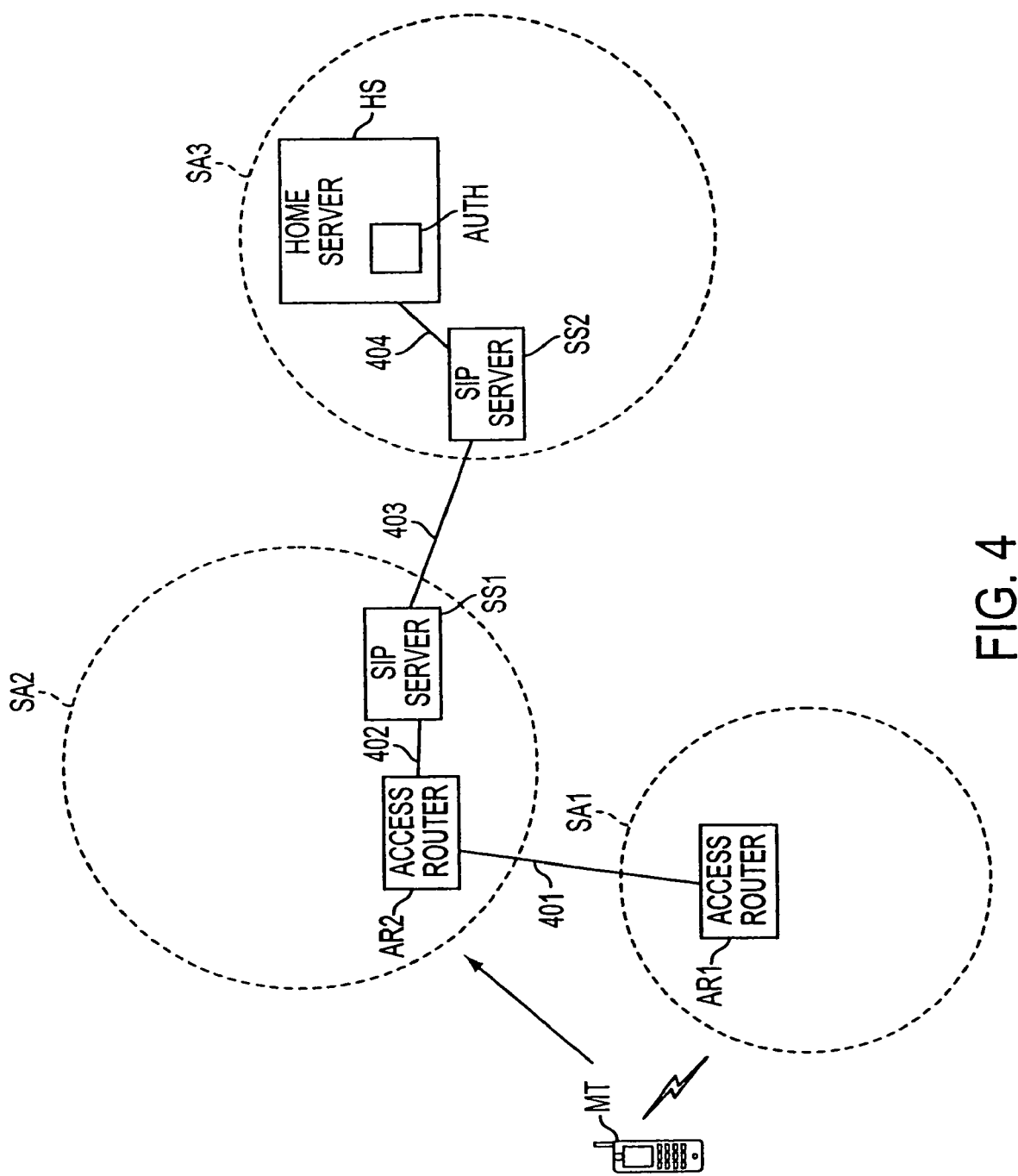
FIG. 4 shows a second embodiment of a system according to the invention using session initiation protocol (SIP) to traverse one network boundary and AAA protocol to traverse another network boundary.

FIG. 4 shows an alternate embodiment according to the invention. According to this embodiment, AR1 communicates with AR2 using the SIP protocol as indicated by path 401. AR2 communicates with a SIP server SS1 also according to the SIP protocol as indicated by path 402. SIP server SS1 communicates with a SIP server SS2 in the home network as indicated by path 403. Finally, SIP server SS2 communicates with AAA server HS using the DIAMETER protocol, as indicated by path 404. All of these communication paths are intended to be illustrative only; other protocols and communication methods can be used to inquire about authorization information in accordance with the invention. For example, authorization information can be pre-stored or cached in a particular access router, avoiding the need to access a home network.

Figure 5:
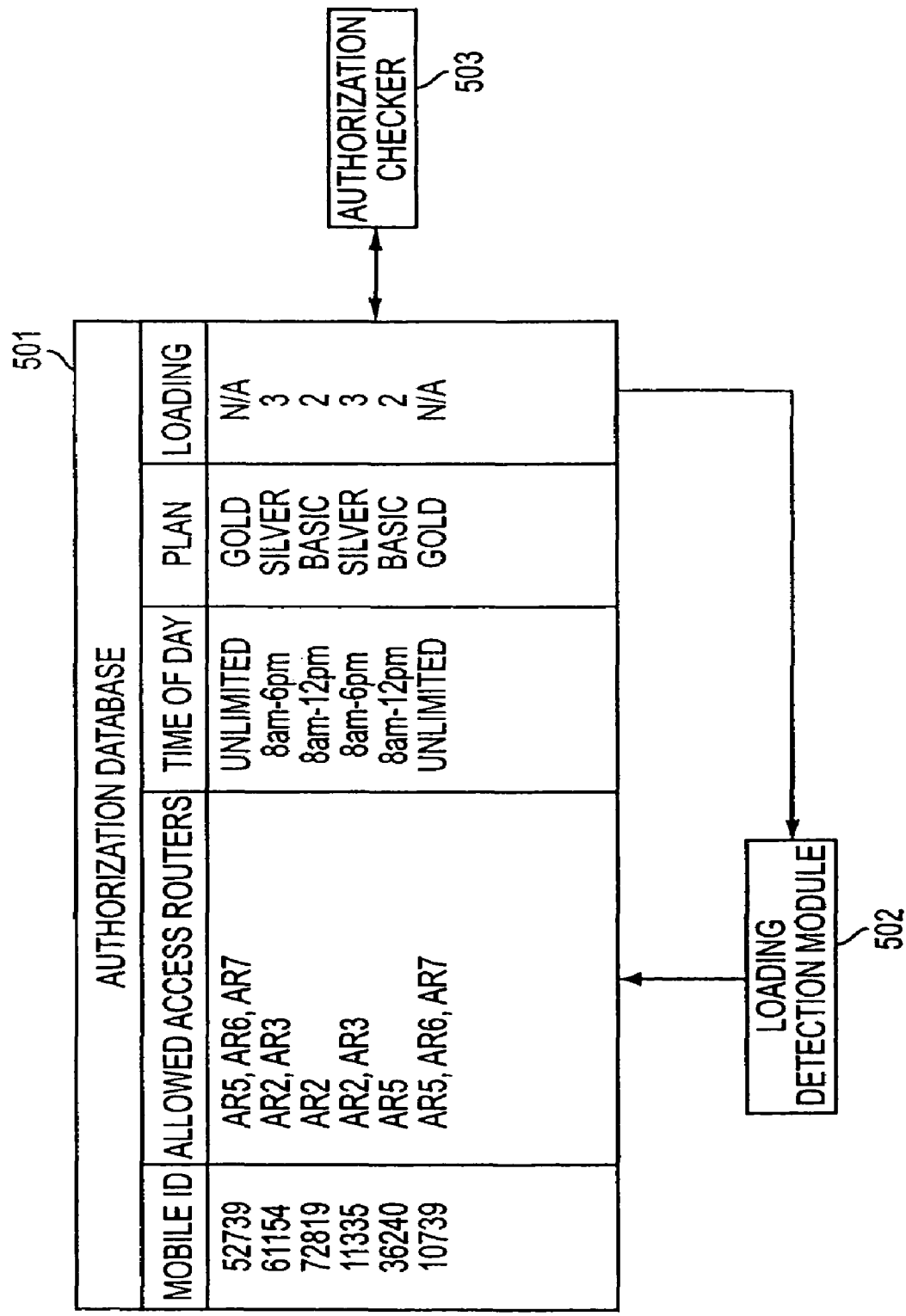
FIG. 5 shows one possible configuration for an authorization database 501, authorization checker 503, and loading detection module 502.

FIG. 5 shows one possible embodiment of an authorization database such as database AUTH shown in FIG. 3 and FIG. 4. Authorization information may comprise static information (e.g., an administratively created list of mobile terminals and the access routers to which they are authorized to be handed off), or dynamically changing information (e.g., authorization based on dynamic loading conditions or other criteria). Additionally, authorization information may be limited by time of day, or a subscription plan to which a mobile subscriber belongs (e.g., a "gold" plan allowing access to all routers; a "silver plan" allowing access to certain routers; and a "basic" plan allowing access to a limited number of access routers).

In one embodiment, subscribers using mobile terminals are identified according to an identifier such an International Mobile Subscriber Identity (IMSI), which is typically recorded in the nonvolatile memory of a mobile terminal such as a mobile telephone. The location of mobile terminals can be identified according to a hierarchical identification scheme, such as a concatenation of Public Line Mobile Network (PLMM) identifier, local area identifier, and base station identifier. Other schemes for identifying subscribers of mobile terminals as well as their location, and storing authorization information for such mobile terminals in a database, are possible.

As shown in FIG. 5, an authorization checker function 503, which may be implemented in software within home server HS, checks for a given mobile ID whether the mobile ID is authorized to be handed off to a given candidate access router. In one variation, the authorization comprises a simple table look-up based on a list of allowed access routers for a given mobile terminal. In alternate embodiments, more sophisticated authorization may be stored. For example, certain mobile terminals may be restricted from accessing certain access routers except during a particular time of day. Mobile terminal subscribers may be assigned to a subscription plan that determines the level of access (e.g., how many access routers and under what conditions they can be accessed for handoff operations). Moreover, dynamic authorization information can be used to authorize mobile terminals on the basis of dynamic conditions such as loading of a particular access router. In this regard, a loading detection module 502 can be implemented to operate in conjunction with a loading parameter to modify the allowed list of access routers based on how heavily the access routers are loaded, such that subscribers who pay extra money get preference during peak loading conditions. Current loading conditions can be provided from access routers to home network servers in order to share information concerning loading conditions. Other variations are of course possible.

Figure 6:
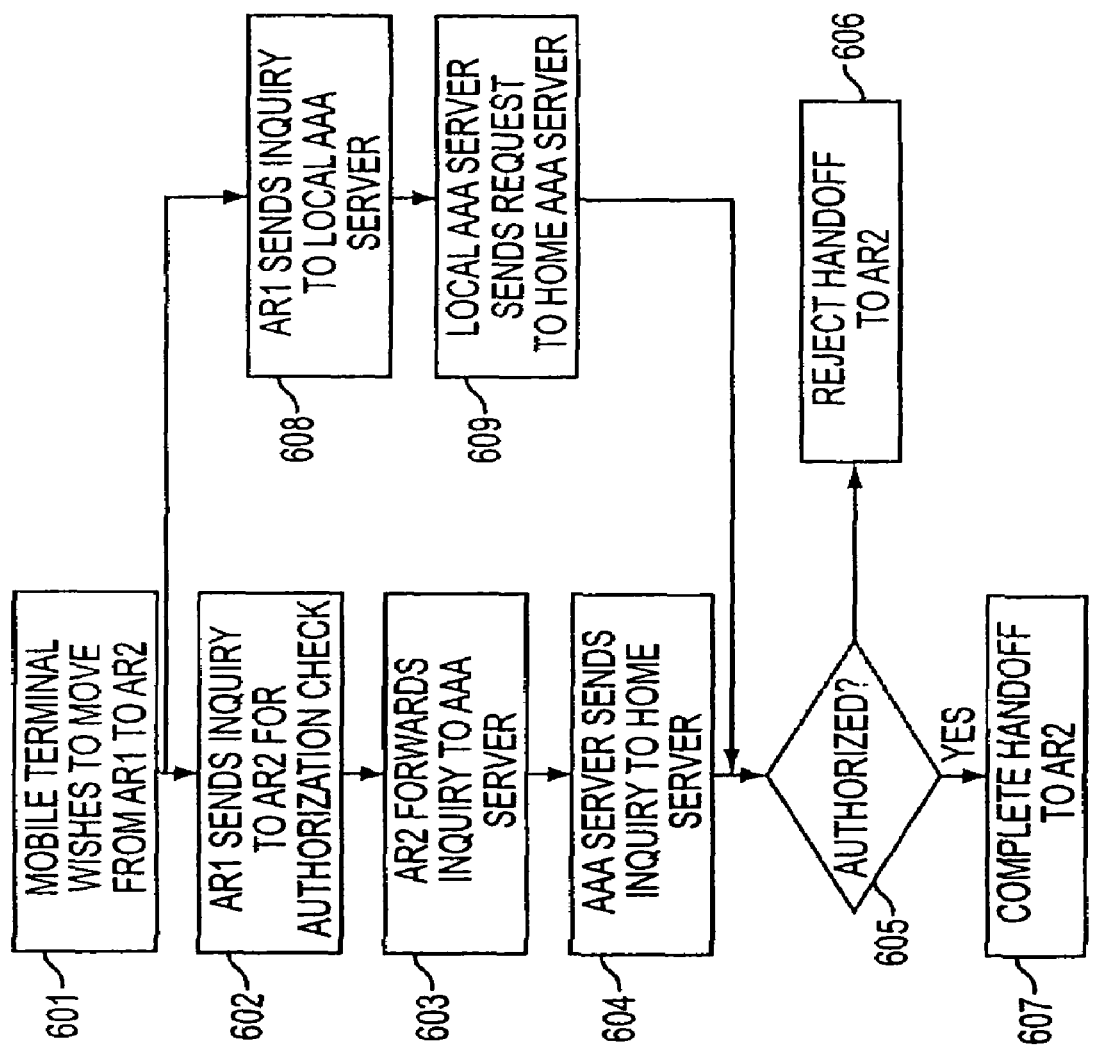
FIG. 6 shows a flow chart illustrating steps of a method for handing off a mobile terminal to a target access router only after verifying that the target access router is authorized to accept a hand-off of the mobile terminal.

FIG. 6 shows a flow chart illustrating various steps that can be carried out in accordance with the invention. In step 601, a mobile terminal wishes to move from an area serviced by a first access router AR1 to an area serviced by a second access router AR2. This can be determined by the mobile terminal receiving an advertisement from the second access router including a router ID. In some cases, the current AR may detect the mobile terminal roaming into another service area and wish to instruct the mobile terminal to go to a particular router and connect to a particular access point.

In step 602, access router AR1 sends an inquiry to AR2 inquiring about authorization for the mobile terminal to be handed off to AR2. In an alternate embodiment, shown at steps 608 and 609, AR1 sends the inquiry to the home server for an authorization check, bypassing steps 602 through 604. As discussed above, access router AR2 may have pre-stored information regarding authorizations for particular mobile terminals to be handed off, avoiding the need for steps 602 through 604 and 608 altogether. In other words, the database query could occur locally within AR2 rather than requiring transmissions to another computer.

In step 603, AR2 forwards the inquiry to an AAA server, which in step 604 forwards the request to a home server corresponding to the mobile terminal. In step 605, a determination is made as to whether the mobile terminal is authorized to be handed off to AR2 using the principles outlined above. If the mobile terminal is not authorized to be handed off to AR2, then in step 606 the handoff is rejected, preferably without using any radio frequency resources between AR2 and the mobile terminal. On the other hand, if the mobile terminal is authorized, then in step 607 the handoff to AR2 is initiated. In the embodiment shown in FIG. 4, the steps are modified slightly to account for the existence of SIP servers SS1 and SS2.

In an alternate embodiment, access router AR1 can query home server HS through another path (e.g., directly or over the Internet), rather than going through access router AR2. In this embodiment, access router AR1 may learn of the existence of AR2 through other means (e.g., from the mobile terminal; through an administrative table; or through a learning function that detects the existence of AR2 through queries and responses).

It should be appreciated that the principles of the invention can be applied not only to mobile IP networks, but to networks of other types. For example, the inventive principles can be applied to perform handovers between a wireless LAN and a GPRS network.

It should also be appreciated that access routers may cache authorization information, avoiding the need to query the home network for authorization information. In the configuration shown in FIG. 3, for example, access router AR2 may be provided with authorization information for a plurality of mobile terminals from home network server HS. Thereafter, AR2 can query its locally cached version of authorization information in order to respond to an authorization inquiry from AR1. Moreover, access router AR1 may query authorization information from home server HS through another path (e.g., over the Internet), without going through access router AR2. Other combinations and paths are of course possible.

Any or all of the functions depicted in the figures can be implemented using computer software executing on a general-purpose or special-purpose digital computer. The authorization information can be stored in a computer memory, relational database, or other data structure. Conventional access routers can be modified to incorporate the functions illustrated in FIG. 3.

As used herein, the term "mobile terminal" should be understood to include IP-enabled cellular telephones and wireless telephones equipped to communicate using other protocols; wirelessly accessible Personal Digital Assistants (PDAs) such as those manufactured by PALM Inc.; notebook computers that can communicate wirelessly; and other mobile devices that can communicate using packetized digital communications over various transmission technologies (including CDMA, GSM, TDMA, and others) or media (radio, infrared, laser, and the like).

Figure 1:
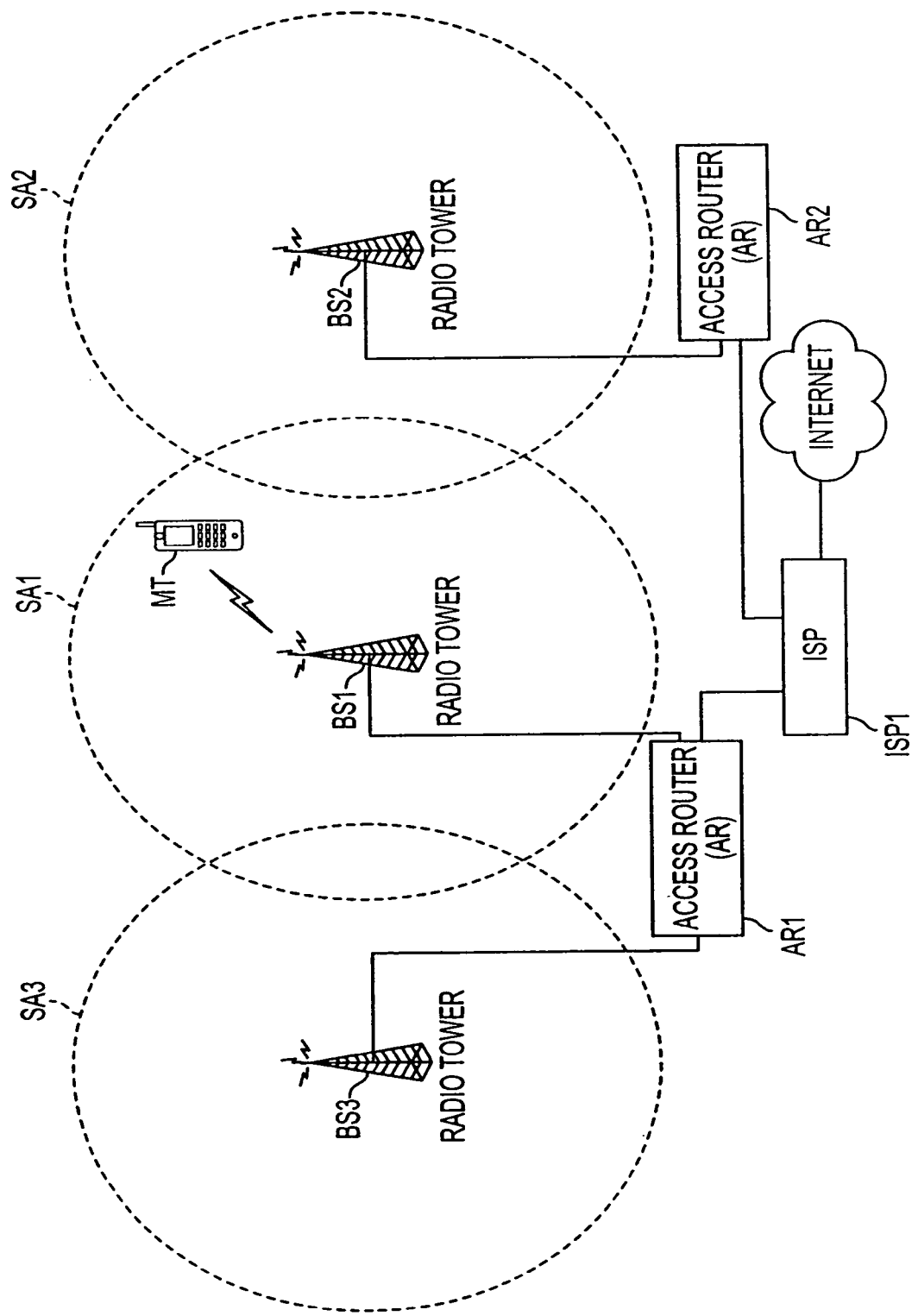
FIG. 1 shows a conventional network covering three service areas SA1, SA2, and SA3.
Figure 2:
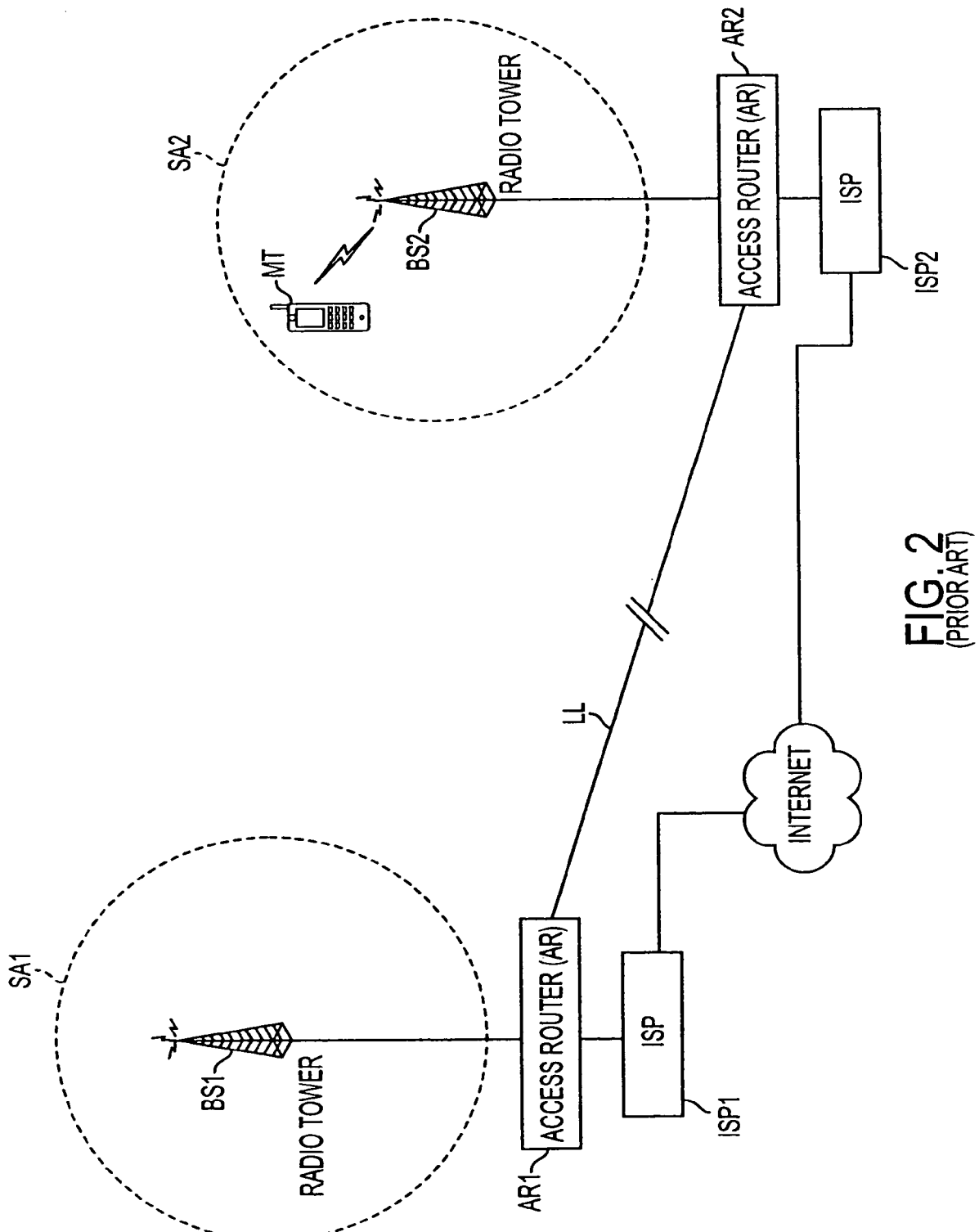
FIG. 2 shows a conventional scheme for handing off a mobile terminal between access routers, wherein the mobile terminal registers with a home agent AR1 but also communicates using a second IP address through a "care of" agent AR2.

The term "access router" should be understood to include computer-implemented devices that route packets, such as IP packets, to addresses in a network based on routing information. However, it should be understood that access routers are generally distinct from base stations/access points, which may rely on different transmission schemes to transmit information (e.g., GSM or CDMA). One or more base stations could be associated with a single access router, as shown in FIG. 1. Alternatively, more than one access router could be associated with a single base station.

The term "mobile IP network" should be understood to include a network or networks (even if incompatible in transmission technology or operated by different carriers) that communicate wirelessly with mobile terminals using Internet Protocol.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. Any of the method steps described herein can be implemented in computer software and stored on computer-readable medium for execution in a general-purpose or special-purpose computer.

We claim:

1. A method comprising: receiving from a first access router in a first network by a second access router in a second network that serves a different service area a request for authorization inquiry including an identifier that identifies a mobile terminal that is a candidate for a handoff operation; causing a database to be queried via a server to determine whether the second access router is authorized to accept a handoff operation for the mobile terminal; in response to determining that the mobile terminal is authorized to be handed off to the second access router, performing a handoff operation from the first access router to the second access router; and in response to determining that the mobile terminal is not authorized to be handed off to the second access router, inhibiting the handoff operation from the first access router to the second access router.

2. The method of claim 1, wherein performing a handoff operation comprises transferring context information from the first access router to the second access router.

3. The method of claim 1, wherein the method is performed without allocating any radio frequency resources of the second access router to communicate with the mobile terminal until after it is determined that the mobile terminal is authorized to be handed off to the second access router.

4. The method of claim 1, wherein the causing the database to be queried comprises causing the database to be queried on the basis of a list of access routers that are authorized to accept handoffs from the mobile terminal.

5. The method of claim 1, wherein the causing the database to be queried comprises causing the database to be queried to determine authorization based on a time of day.

6. The method of claim 1, wherein the causing the database to be queried comprises causing the database to be queried on the basis of dynamic loading conditions.

7. The method of claim 1, further comprising modifying the database on the basis of dynamic loading conditions, such that authorization is dependent upon dynamic loading conditions.

8. The method of claim 1, wherein the method is conducted between access routers that use same access technology.

9. The method of claim 1, wherein the method is conducted between access routers that use heterogeneous access technologies.

10. The method of claim 1, wherein querying the database is performed using the DIAMETER protocol.

11. The method of claim 1, wherein querying the database is performed using the Session Initiation Protocol (SIP) protocol.

12. The method of claim 1, comprising sending a request for authorization information concerning the mobile terminal to an administrative server associated with a network served by the second access router, the administrative server comprising an authentication, authorization and accounting (AAA) server.

13. The method of claim 1, comprising sending a request for authorization information concerning the mobile terminal to an administrative server associated with a network served by the second access router, the administrative server comprising a Session Initiation Protocol (SIP) server.

14. The method of claim 1 comprising querying the database on the basis of a membership plan associated with a subscriber of the mobile terminal.

15. An access router comprising: a processor, and memory storing computer executable instructions that, when executed by the processor perform:
receiving by the access router in a network from another access router in another network that serves a different service area a request for an authorization inquiry including an identifier that identifies a mobile terminal that is a candidate for a handoff operation;
causing a database to be queried via a server to determine whether the access router is authorized to accept a handoff operation for the mobile terminal;
in response to determining that the mobile terminal is authorized to be handed off to the access router, performing a handoff operation with the another access router; and
in response to determining that the mobile terminal is not authorized to be handed off to the access router, inhibiting the handoff operation with the another access router.

16. The access router of claim 15, wherein performing a handoff operation comprises transferring context information from the another access router to the access router.

17. The access router of claim 15, wherein the method is performed without allocating any radio frequency resources of the access router to communicate with the mobile terminal until after it is determined that the mobile terminal is authorized to be handed off to the access router.

18. The access router of claim 15, wherein the computer executable instructions, when executed, performs causing the database to be queried on the basis of a list of access routers that are authorized to accept handoffs of the mobile terminal.

19. The access router of claim 15, wherein the computer executable instructions, when executed, performs causing the database to be queried to determine authorization that is dependent on a time of day.

20. The access router of claim 15, wherein the computer executable instructions, when executed, performs causing the database to be queried on the basis of dynamic loading conditions.

21. The access router of claim 15, wherein the computer executable instructions, when executed, performs causing information concerning current loading conditions to be provided to the database, such that authorization is dependent upon dynamic loading conditions.

22. The access router of claim 15, wherein the access router serves mobile terminals using Internet Protocol.

23. The access router of claim 15, wherein the access router uses a different access technology than the another access router from which the candidate handoff is to be performed.

24. The access router of claim 23, wherein the access router uses wireless LAN technology, and wherein the another access router uses GPRS technology.

25. The access router of claim 15, wherein the access router uses the same access technology as the another access router from which the candidate handoff is to be performed.

26. The access router of claim 15, wherein the computer executable instructions, when executed, performs sending the authorization information to an administrative server using DIAMETER protocol.

27. The access router of claim 15, wherein the computer executable instructions, when executed, performs sending the authorization information to an administrative server using Session Initiation Protocol (SIP) protocol.

28. The access router of claim 15, wherein the computer executable instructions, when executed, performs causing the database to be queried on the basis of a membership plan associate with a subscriber of the mobile terminal.

29. A method comprising:
prior to initiating a handoff operation of a mobile terminal from a first network served by a first access router to a second network served by a second access router, sending an authorization inquiry from the first access router to a home network associated with the mobile terminal via a server, the authorization inquiry including an identifier that identifies the mobile terminal;

receiving a result of a database query from the home network, wherein the result of the database query indicates whether the mobile terminal is authorized to be handed off to the second access router;
in response to determining that the mobile terminal is authorized to be handed off to the second access router, performing a handoff operation from the first access router to the second access router; and
in response to determining that the mobile terminal is not authorized to be handed off to the second access router, inhibiting the handoff operation from the first access device to the second access router.

30. The method of claim 29, wherein receiving the result of the database query from the home network comprises receiving a result that depends on dynamic loading conditions associated with the second access router.

31. The method of claim 29, wherein receiving the result of the database query from the home network comprises receiving a result corresponding to querying the database to determine authorization based on a time of day.

32. The method of claim 29, wherein receiving the result of the database query from the home network comprises receiving a result corresponding to querying the database on the basis of dynamic loading conditions.

33. The method of claim 29, wherein the method is performed without allocating any radio frequency resources for communicating between the second access router and the mobile terminal until after it has been determined that the mobile terminal is authorized to be handed off to the second access router.

34. The method of claim 29, comprising sending a request for authorization information concerning the mobile terminal to an administrative server associated with the second network, the administrative server comprising an authentication, authorization and accounting (AAA) server.

35. The method of claim 29, comprising sending a request for authorization information concerning the mobile terminal to an administrative server associated with the second network, the administrative server comprising a Session Initiation Protocol (SIP) server.

36. The method of claim 29 comprising querying the database on the basis of a membership plan associated with a subscriber of the mobile terminal.

\* \* \* \* \*